United States Patent Office 3,331,884
Patented July 18, 1967

3,331,884
PRODUCTION OF 2-METHYLPENTENE-2
Alan Arthur Yeo, James Keith Hambling, and Geoffrey Winton Alderson, Sunbury-on-Thames, Middlesex, England, assignors to The British Petroleum Company Limited, London, England, a British joint-stock corporation
No Drawing. Filed Mar. 15, 1961, Ser. No. 95,801
Claims priority, application Great Britain, Mar. 23, 1960, 10,368/60; May 31, 1960, 19,211/60; July 15, 1960, 24,723/60; Nov. 22, 1960, 40,094/60
5 Claims. (Cl. 260—683.15)

This invention relates to a process for the dimerisation of propylene to obtain 2-methylpentene-2.

In British patent specification 824,917 is disclosed a process for dimerising propylene to a hexene product consisting of hexene isomers which comprises reacting propylene in the presence of an alkali metal catalyst at a temperature of from 100° F. to 400° F. and a pressure of from 1 atmosphere to 100 atmospheres. It is stated that the catalyst may be a liquid metal catalyst, metal in a film on an inert support, or a solid metal catalyst. It is stated, in accordance with a specific example, that by the use of a catalyst consisting of potassium metal dispersed on potassium carbonate, an 80% conversion of propylene to hexene is obtained. However the main product obtained was stated to be 4-methylpentene-1; yields of 2-methylpentene-2 were very low, being of the order of 1% based on total hexene in the product.

In British patent specification 825,902 it is disclosed that compounds of alkali metals with elemental carbon, the ratio of alkali metal to carbon being 1:8 to 1:64, act as polymerisation agent and in illustration there is described the polymerisation of alpha-methylstyrene to high molecular weight products using a catalyst of the formula $KC_8$.

We have now found that by the use of a specific class of complexes of potassium and carbon as catalyst, propylene can be polymerised to give improved yields of 2-methylpentene-2.

Thus according to this invention there is provided a process for the production of 2-methylpentene-2 which comprises maintaining propylene in contact with a catalyst consisting of or containing a lamellar complex of potassium and carbon and having the formula $KC_x$, where $x$ has a value of 24 or higher.

Preferably $x$ has the value 36, 48, or 60. If desired mixtures of the complexes may be used. The production of potassium complexes is described by W. Rudoff and E. Schulze in Zeitung Anorg. u. allgem. Chem., vol. 277 at page 156 et seq. (1954).

Usually a pre-formed complex of the type hereinbefore described will be brought into contact with propylene, this is not essential if the polymerisation conditions are such that the complex will form in situ and in this case a mixture of alkali metal and carbon may be contacted with propylene.

The catalyst may consist wholly of the lamellar complex or complexes or may consist of or contain a mixture of the lamellar complex with an alkali metal, preferably potassium, supported on carbon, said mixture containing the lamellar complex in any proportion. The proportion of the catalyst existing as lamellar complex will be determined, at least in part, by the nature of the carbon employed and by the relative proportions of alkali metal and carbon. Furthermore, if desired, the catalyst may contain free carbon.

The carbon employed in forming the lamellar complex will preferably be wholly or partly in the form of natural or synthetic graphite. However, other forms of carbon may be employed providing that they are capable of reacting with an alkali metal to form a lamellar complex. Thus there may be employed forms of carbon which contain graphite in microcrystalline form together with carbon of a nature which does not form lamellar complexes with alkali metals. The carbon employed may contain trace impurities in the form of metal compounds. Metals derived from trace impurities, for example, iron, silicon and aluminium, may form an association with these lamellar structures, and may exert a modifying effect upon the reactions according to this invention.

It is believed that under certain conditions the polymer initially formed will be, in part, isomerised while in association with the catalyst. It is probable that trace elements which modify the action of the lamellar compounds or complexes do so by changing the rate of an isomerisation reaction relative to the polymerisation reaction. Variations in yield at a given value of $x$ are to be expected when using $KC_x$ complexes derived from different sources of carbon. These variations probably arise from variations in the amounts of trace impurities which, it is believed, exert a modifying action on the course of the reaction. In general $KC_x$ compounds derived from carbon of high ash content favour high yields of 2-methylpentene-2. In general, high yields of 2-methylpentene-2 will be obtained when the value of $x$ is high.

Preferably the $KC_x$ complex contains a small amount of iron and/or aluminium, usually in the form of oxide. These elements are usually present in commercially available carbon and thus will usually be present in $KC_x$ compounds derived therefrom. However, if desired, small amounts of reaction modifying elements for example iron and/or aluminium and/or silicon, in elemental or combined form, may be added to the $KC_x$ compound or to the carbon used in its formation. Preferably these elements or their compounds will be added in trace amounts whereby the structure of the lamellar complex remains essentially that of a lamellar complex of only alkali metal and carbon. When using $KC_{24}$ it is necessary to use $KC_{24}$ derived from carbon having a high content of trace elements since in their absence the reaction to 4-methylpentene-1 is favoured.

The preferred reaction temperature will lie in the range 150 to 200° C., suitable about 160° C. Above 200° C. higher polymers are formed.

Usually the reaction pressure will be superatmospheric, preferably being in the range 50 to 4000 lbs./sq. in. gauge. The combination of polymerisation conditions employed will be selected to favour the formation of 2-methylpentene-2.

The process may be carried out either in the presence or absence of a solvent. Preferred solvents are hydrocarbon, for example normally liquid paraffins; normal heptane is a particularly suitable solvent. When using a $KC_x$ compound in which $x$ is greater than 24 the use of a solvent usually improves yield.

Preferably the propylene employed as feedstock will be free of water. In general, the propylene should have a water content not greater than 0.001% by wt.; in comparison with a process using propylene saturated with water the improvement in yield of propylene dimer, using suitable reaction conditions is usually quite marked and in certain cases may be as much as 30% by wt.

It will be apparent that it is essentially to avoid conditions which would lead to the presence of a slug of water in liquid phase reaching the polymerisation catalyst.

Preferably the propylene employed as feedstock will be free of allene and of methylacetylene. In general, if these compounds are present they should constitute in total less than 0.02% by weight of the propylene.

Preferably compounds employed as feedstock for the process of this invention are treated, before use, for the reduction of allene and/or methylacetylene content by selective hydrogenation over a supported nickel catalyst, for example, nickel-on-sepiolite.

The propylene should be free of oxygen; if present it should not constitute more than 5 p.p.m. by wt. based on propylene.

If desired the propylene may be employed in the presence of a gas which is inert under the conditions of the reaction. Thus nitrogen, methane, ethane or propane may be present in the feedstock.

The reaction may be carried out batchwise or continuously.

The catalyst may be employed as a fixed bed, fluidised bed or as a slurry in solvent or in one or more of the reaction products.

According to one aspect of this invention there is provided a process which comprises maintaining propylene in contact with a catalyst consisting of or containing a lamellar complex of potassium and carbon and having the formula $KC_x$ where $x$ is at least 24, recovering from the product a $C_6$ fraction and recovering, from the $C_6$ fraction 2-methylpentene-2.

Product recovery will usually be achieved by distillation. Usually distillation will be carried out in a column of at least 60 theoretical plates, suitably circa 100 theoretical plates.

The invention is illustrated but not limited with reference to the following examples.

EXAMPLE 1

6.5 grams of potassium was mixed with 72 grams of graphite (mol ratio of potassium to carbon thus being 1:36) and the mixture heated at 275° C. for 1 hour in an atmosphere of nitrogen. After cooling in nitrogen the solid was transferred (in nitrogen) to a 1 litre stainless steel autoclave. The autoclave was heated to 160° C. and liquid propylene passed in under nitrogen pressure to a gaseous pressure of 1200 lb./sq. in. gauge. The mixture was rocked for 20 hours and excess propylene and reaction products collected in traps cooled at −78° C. Excess propylene was allowed to evaporate and the residue distilled and analysed by infra-red and gas chromatographic techniques.

Yield of liquid products was 17 grams of which 95% by wt. were $C_6$ hydrocarbons. Product analysis of the $C_6$ hydrocarbons was:

| | |
|---|---|
| 4-methylpentene-1 | 1.6 |
| 4-methylpentene-2 | 16.3 |
| 2-methylpentene-2 | 62.7 |
| 2-methylpentene-1 | 12.0 |
| Normal hexenes | 8.4 |

EXAMPLE 2

6.5 grams of potassium with varying amounts of graphite were heated at 275° C. for 1 hour in an atmosphere of nitrogen. After cooling in nitrogen the solid was transferred (in nitrogen) to a 1 litre stainless steel autoclave. The autoclave was heated to 160° C. and liquid propylene passed in under nitrogen pressure to a gaseous pressure of 1500 lbs./sq. in. gauge. The mixture was rocked for 20 hours and excess propylene and reaction products collected in traps cooled at −78° C. Excess propylene was allowed to evaporate and the residue distilled and analysed by infra-red and gas chromatographic techniques.

Composition of the propylene was:

| | Mol percent |
|---|---|
| $C_3H_6$ | 99.29 |
| $C_3H_8$ | 0.63 |
| $C_2H_6$ | 0.08 |

Composition of the graphite used for the production of catalyst was as follows:

Table 1

| | |
|---|---|
| Ash at 900° C. (percent by wt.) | 0.60 |
| Main impurities | Fe, Si |
| Surface area (sq. meters/gram) | 93 |

Catalyst composition expressed as mole ratio of carbon to potassium used to form and $KC_x$ compound, yield of product and product analysis were as shown in Table 2:

Table 2

| | Run No. 1 | Run No. 2 |
|---|---|---|
| Carbon/potassium, mol ratio | 48 | 60 |
| Yield (gms.) | 140 | 116 |
| Percent $C_6$ | 91 | 90 |
| Product Analysis (percent by weight total product): | | |
| 4 Methylpentene-1 | 1.5 | 1.1 |
| 4 Methylpentene-2 | 18.8 | 16.7 |
| 2 Methylpentene-2 | 59.5 | 62.4 |
| 2 Methylpentene-1 | 14.0 | 15.0 |
| 2-hexenes | 4.7 | 4.2 |

It is an advantage of the present invention that dimerisation is carried out with a low make of higher boiling products.

What we claim is:

1. A process for the production of 2-methylpentene-2 which comprises: contacting propylene with a catalyst consisting essentially of a lamellar complex of potassium and graphite and having the formula $KC_x$, where $x$ has a value of at least 36.

2. A process according to claim 1, in which the reaction temperature lies in the range between about 150° C. and about 200° C.

3. A process according to claim 1, in which the reaction pressure lies in the range of 50–4000 p.s.i.g.

4. A process according to claim 1, in which said catalyst has the formula $KC_x$, where $x$ has a value of between 36 and 60.

5. A process according to claim 1, in which the graphite constituent of said catalyst has a high ash content.

References Cited

UNITED STATES PATENTS

| | | | |
|---|---|---|---|
| 2,881,234 | 4/1959 | Esmay et al. | 260—683.15 |
| 2,965,624 | 12/1960 | Anderson | 260—94.2 |
| 2,986,588 | 5/1961 | Schramm | 260—683.15 |

FOREIGN PATENTS 825,902   12/1959   Great Britain.

PAUL M. COUGHLAN, Jr., *Primary Examiner.*

ALPHONSO D. SULLIVAN, *Examiner.*